United States Patent
Gioutsos et al.

(10) Patent No.: US 6,789,818 B2
(45) Date of Patent: Sep. 14, 2004

(54) VARIABLE TIME VENTING ALGORITHM

(75) Inventors: Tony Gioutsos, Novi, MI (US); Daniel Tabar, Canton, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/388,428

(22) Filed: Mar. 17, 2003

(65) Prior Publication Data

US 2004/0084883 A1 May 6, 2004

Related U.S. Application Data

(60) Provisional application No. 60/422,699, filed on Oct. 31, 2002.

(51) Int. Cl.[7] ............................................. B60R 21/32
(52) U.S. Cl. ....................... 280/735; 280/743.2; 701/45
(58) Field of Search ................................ 280/735, 736, 280/739, 743.2; 701/45

(56) References Cited

U.S. PATENT DOCUMENTS 5,957,490 A * 9/1999 Sinnhuber ................... 280/735
6,129,379 A    10/2000 Specht ....................... 280/735
6,308,983 B1 * 10/2001 Sinnhuber ................... 280/735

FOREIGN PATENT DOCUMENTS

DE              19611384 A1 *  9/1997  ........... B60R/21/26

* cited by examiner

Primary Examiner—Peter C. English
(74) Attorney, Agent, or Firm—Lonnie Drayer; John Carlson (57) ABSTRACT

An algorithm for evaluating information from sensors interacting with strips that are extended during activation of the airbag determines whether the airbag has contacted an out-of-position occupant. In one embodiment, each strip includes an alternating pattern that generates a frequency in a sensor through which the strip passes during deployment. The frequency generated is based upon the speed with which the strip passes by the sensor and, in turn, the speed of deployment of the airbag. A controller evaluates the frequency and the changes in frequency from the sensor during deployment. Depending upon the specific configuration of the system and the specific vehicle, a decrease in the speed of deployment of the airbag may be indicated by a decrease in the frequency of the signal. A decrease in speed of deployment may indicate that the airbag is in contact with an occupant.

10 Claims, 10 Drawing Sheets

VARIABLE TIME VENTING ALGORITHM

This application claims priority to U.S. Provisional Application Ser. No. 60/422,699, filed Oct. 31, 2002.

BACKGROUND OF THE INVENTION

The present invention relates generally to a vehicle occupant safety system and more particularly to a vehicle occupant active restraint system that determines contact with an out-of-position occupant during activation and consequently reduces activation force to reduce the possibility of injury to the out-of-position occupant. Generally, an occupant who is positioned relative to the active restraint in a manner such that full activation of the restraint may cause injury is considered an "out-of-position" occupant.

Many known systems have been developed for determining the position of an occupant within a motor vehicle for the purpose of determining whether and with how much force to activate an active safety restraint such as an airbag. For example, some known systems determine if an occupant is sitting too close to an airbag and may consequently determine not to fire the airbag in the event of an accident or may determine to fire the airbag with less force.

U.S. Pat. No. 6,129,379, assigned to the assignee of the present invention, discloses an airbag module with a plurality of strips attached to the airbag. During the deployment of the airbag, the speed with which the strips are extended can be evaluated to determine the speed of deployment of the airbag.

SUMMARY OF THE INVENTION

The present invention provides an algorithm for evaluating information from sensors interacting with strips that are extended during activation of the airbag.

In one embodiment, each strip includes an alternating pattern that generates a frequency in a sensor through which the strip passes during deployment. The frequency generated is based upon the speed with which the strip passes by the sensor and, in turn, the speed of deployment of the airbag. A controller evaluates the frequency and the changes in frequency over time during deployment. Depending upon the specific configuration of the system and the specific vehicle, a decrease in the speed of deployment of the airbag may be indicated by a decrease in the frequency of the signal. A decrease in speed of deployment may indicate that the airbag is in contact with an occupant.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
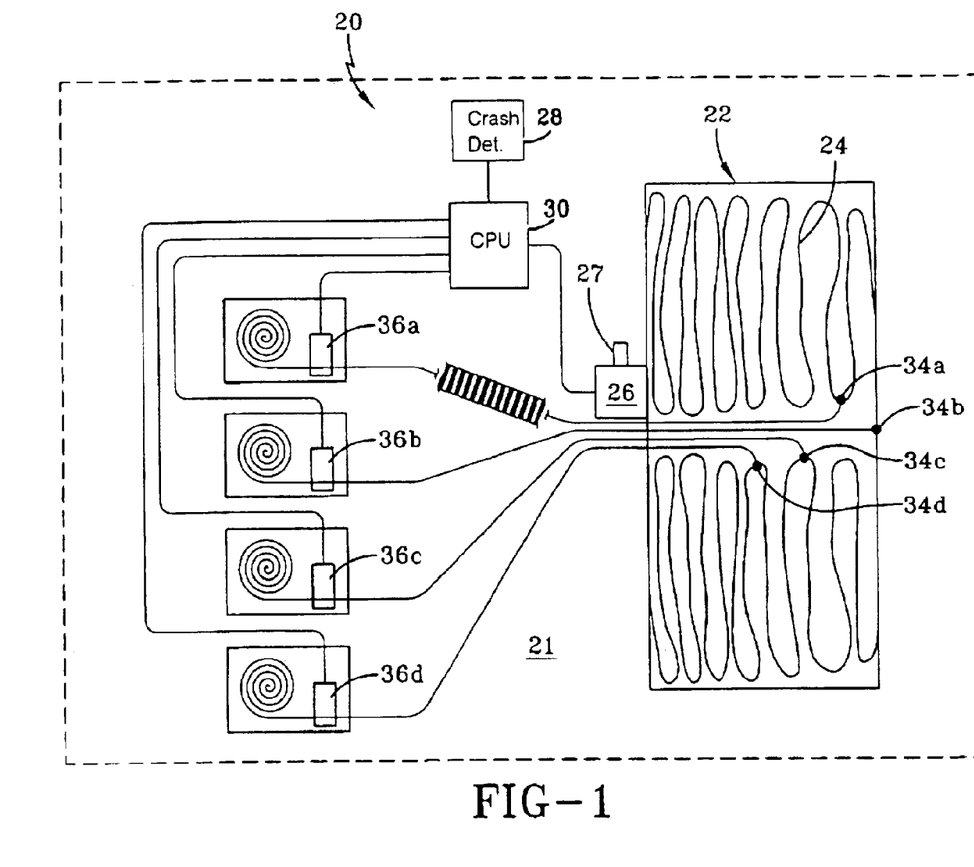
FIG. 1 is a schematic of the vehicle occupant safety system of the present invention installed in a vehicle.

A vehicle occupant safety system 20 is shown schematically in FIG. 1 installed in a vehicle 21. The vehicle occupant safety system 20 generally includes an active restraint 22, which in this example is an airbag module 22. The airbag module 22 includes an airbag 24 and an airbag inflator 26 with a selectively actuatable vent 27. The system 20 further includes a crash determination module 28, which includes one or more crash sensors such as inertial sensors, accelerometers or ball-in-tube sensors, or any other inertial sensor or other crash sensor or combination thereof. A controller 30 generally includes a CPU with a processor, memory and other necessary hardware and software to perform the functions described herein.

Generally, the controller 30, based upon information from the crash determination module 28, determines whether to fire the airbag module 24, when to fire the airbag module 24 and with how much force to fire the airbag module 24 (in the case of a variable force inflator 26). The vent 27 in the airbag inflator 26 permits the controller 30 to cease inflation of the airbag 24 at any moment based upon a determination by the controller 30 that the airbag 24 has contacted an occupant and/or an out-of-position occupant.

A plurality of strips 34 (three shown as 34a, 34b, 34c and 34d and referred to generically as 34), each including a pattern, such as light and dark areas, are connected to various points on the airbag 24. The pattern may alternatively comprise holes or serrations, electrical connections, magnetic patterns or any optical, mechanical or magnetic pattern. The pattern is preferably regular, with equal black and white areas, but the pattern could comprise unequal black and white areas, and could have a spacing that varies over the length of the strip 34.

The pattern of each strip 34a, b, c, d passes through a sensor 36a, b, c, d respectively, to generate a signal that varies based upon the speed that the strip 34 passes through the sensor 36. If the pattern is a regular pattern of light and dark areas, for example, the sensors 36 would be optical sensors 36 and the signals would each vary in frequency based upon the speed of the respective strip 34. In the preferred embodiment, the sensors 36 are sampled at a rate preferably at least twice the highest frequency expected to be experienced. The particular technique for evaluating the signals from the sensors 36 will be described in more detail below.

Figure 2:
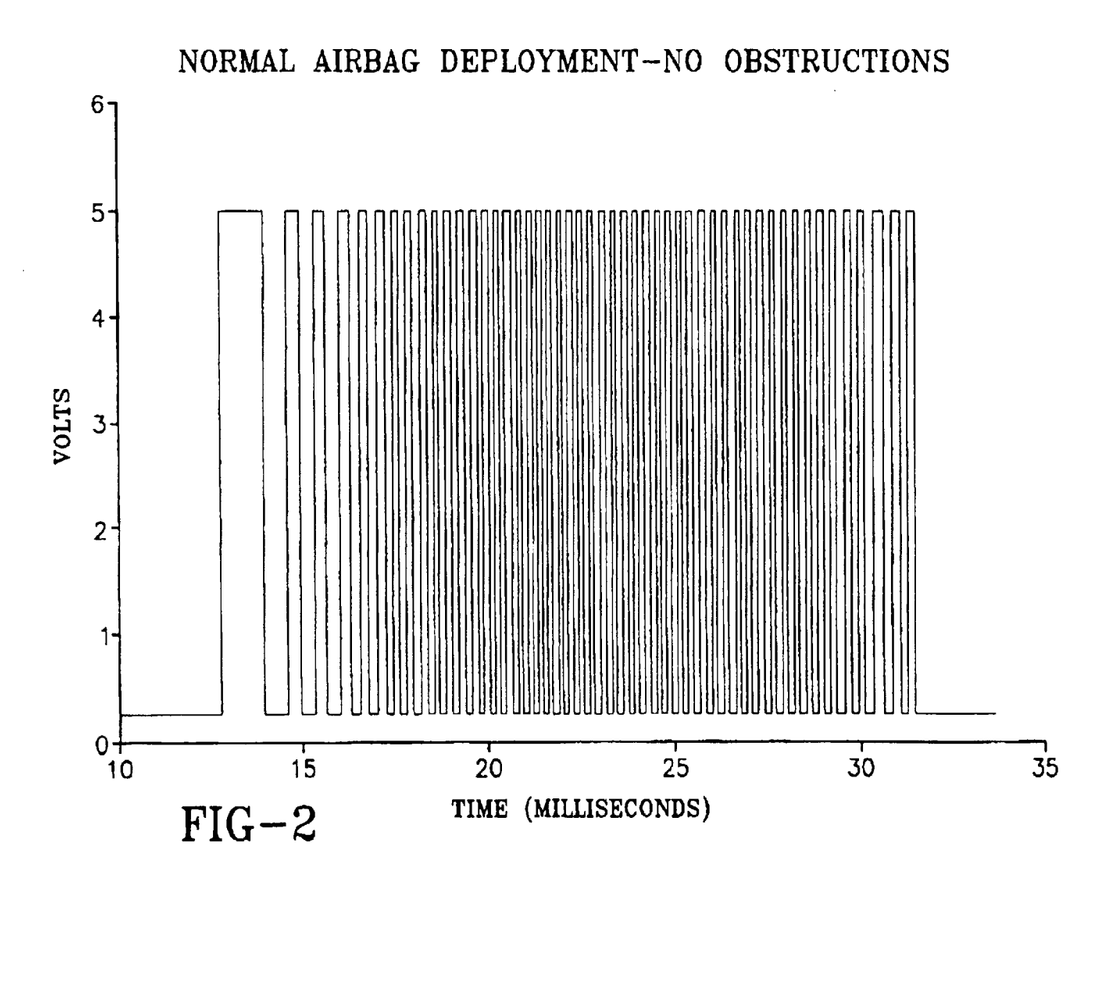
FIG. 2 is a graph of the output of a sensor during a normal deployment with no obstructions.

FIG. 2 shows a graph of the output of one sensor 36 for one strip 34 during a normal airbag 24 deployment with no obstructions. As can be seen, the frequency of the sensor 36 output increases as the velocity of the airbag 24 and strips 34 increases during deployment. The outputs of the other sensors 36 for the other strips 34 would be similar but may vary depending upon the specific configuration of the airbag 24. In the graph, the five volt samples correspond to the light areas of the strip 34 and the 0.2 volt samples correspond to the dark areas of the strip 34 as the strip 34 is pulled through its associated sensor 36. In FIG. 2, it can be seen that initially many samples are taken from each of the light areas before samples are taken in the dark areas, and vice versa. The number of samples taken in each area (light or dark) rapidly decreases, and the corresponding widths of the resulting high and low values become narrower and narrower, and the frequency of the signal becomes higher and higher as the speed of the strip increases during deployment.

Figure 3:
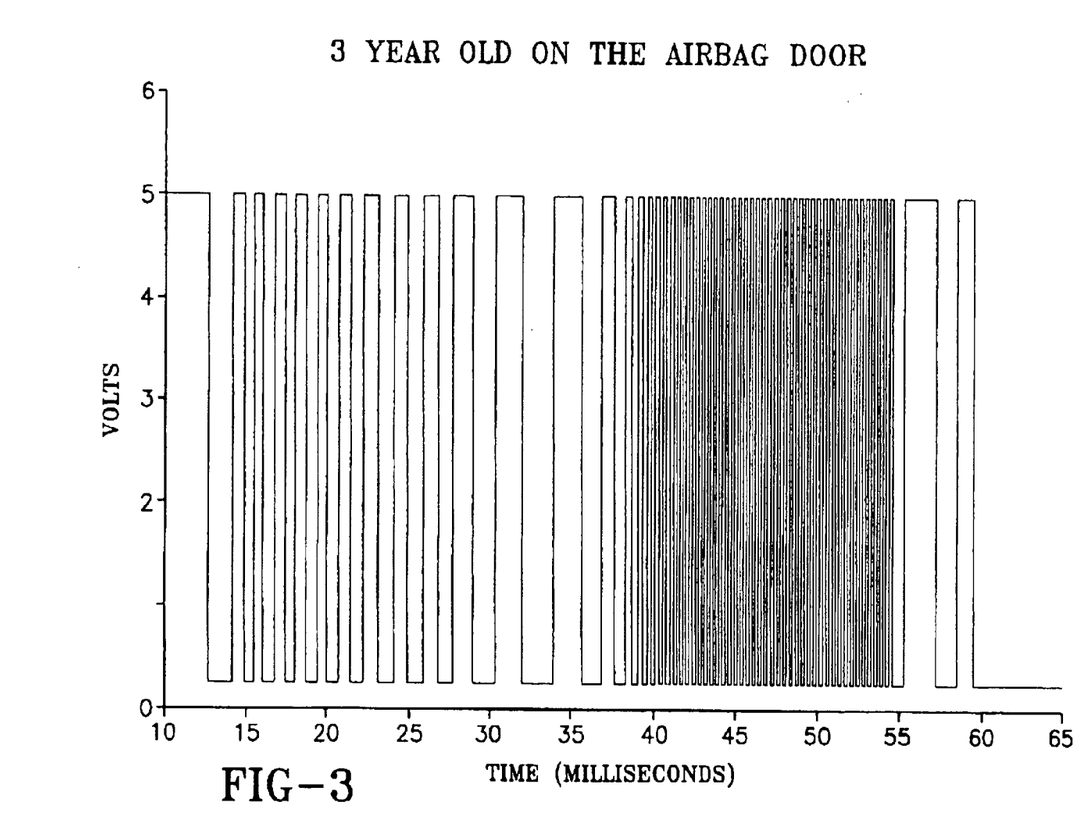
FIG. 3 is a graph of the output of a sensor during a simulated deployment with a 3-year-old on the airbag door.

FIG. 3 is a graph similar to that of FIG. 2, during a simulation of a 3-year-old occupant on the airbag door. As can be seen, the frequency of the sensor 36 output decreases as the airbag 24 impacts the occupant.

Figure 4:
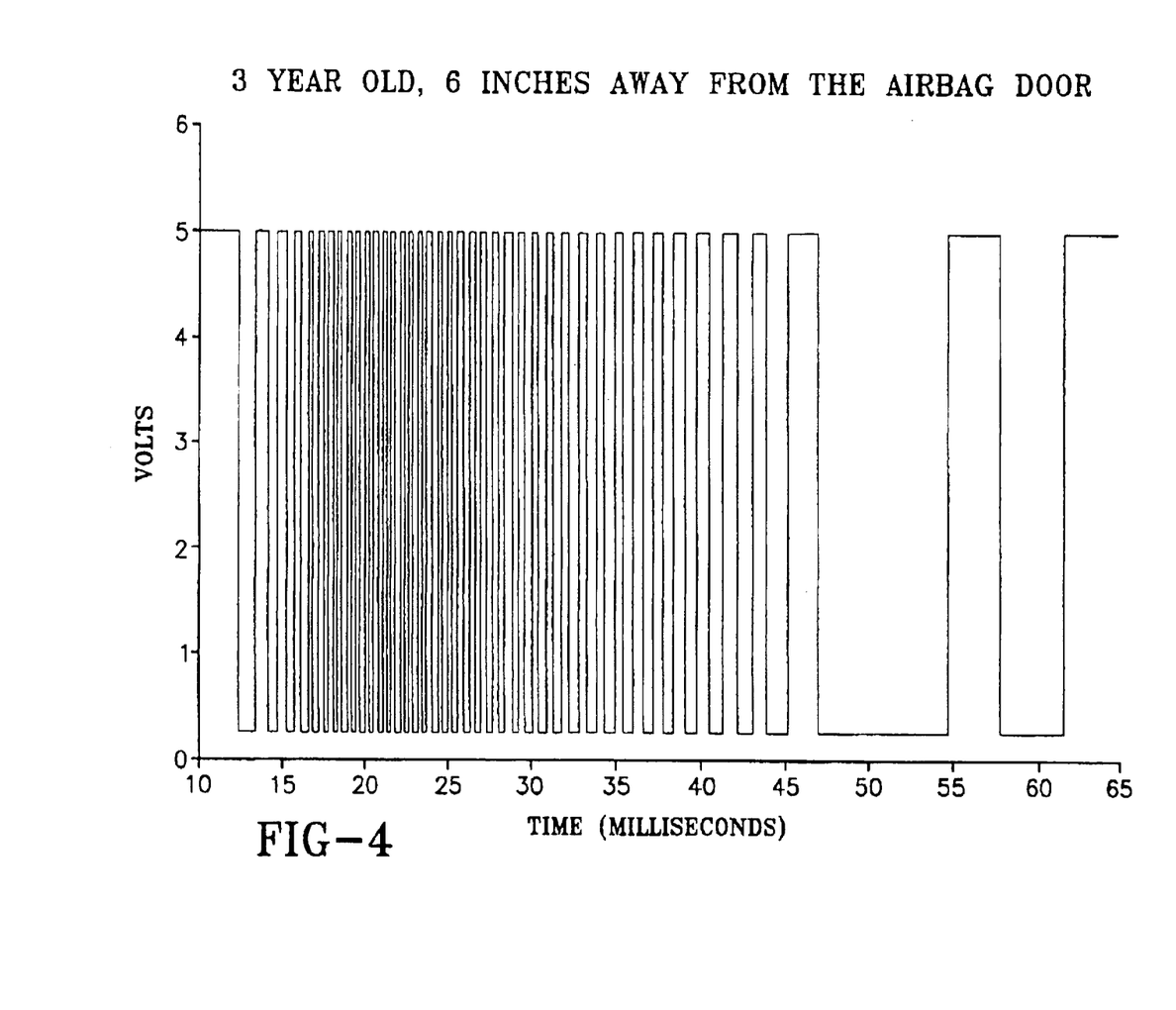
FIG. 4 is a graph of the output of a sensor during a simulated deployment with a 3-year-old six inches from the airbag door.

FIG. 4 is similar graph, simulating a 3-year-old occupant 6 inches from the airbag door. Again, the frequency of the sensor 36 output decreases as the airbag 24 impacts the occupant.

In the present invention, the controller 30 monitors the velocity of the airbag 24 during deployment by monitoring the signals from the sensors 36. In the present example, the controller 30 monitors the frequency of the outputs of the sensors 36. In the event that the controller 30 determines that a change in velocity (or lack of change in velocity) indicates that an out-of-position occupant has been impacted, the controller 30 activates the vent 27 on the airbag inflator 26, which releases the expanding gas from the inflator 26 outside the airbag 24, thus ceasing inflation or decreasing the inflation force of the airbag 24. The controller 30 determines that the airbag 24 has impacted art occupant by performing a time frequency analysis, e.g. comparing the velocity (i.e., the frequency) to a threshold that varies over time from the initiation of the airbag 24 inflation.

Preferably, the controller 30 analyzes the signal from each sensor 36 for each strip 34 by applying a fast Walsh Transform to the raw data of FIGS. 2–4. A Walsh Transform isolates the particular component frequencies in the signals from the sensors 36. The controller 30 then compares the Walsh Transform of each signal from each sensor 36 periodically to a frequency-based threshold. The threshold is a function of frequency and time. A different frequency-based threshold is used at each comparison over time, since it is expected that the frequencies will change over time in a normal, unobstructed actuation of the airbag 24. The thresholds are developed based upon the particular vehicle 21 and the particular airbag module 22. The signal from each sensor 36 may need to be compared to a different set of thresholds, again based upon the particular application. If the controller 30 determines that the Walsh Transform of the signal from one or more of the sensors 36 crosses their respective thresholds, then the controller 30 determines that the airbag 24 is beginning to impact an occupant. The controller may then activate the vent 27 on the inflator to reduce the inflation force of the airbag 24. The controller 30 can be configured to activate the vent 27 if any one of the sensors 36 crosses the threshold, or based upon the sum or the average of the sensors 36, or any other statistical analysis of the signals from the multiple sensors 36.

The present invention reduces the possibility of injury to the out-of-position occupant by determining the impact of the airbag 24 with the occupant and activating the vent 27 on the airbag inflator 26 without the need for external occupant position sensors.

In an alternate technique of the present invention, the controller 30 counts the number of samples of the output of each of the sensors 36 that are of each of the pattern outputs (i.e. black and white, or hole and no-hole) before it switches to the other of the pattern outputs. For example, the controller 30 might sample 25 black outputs, then 23 white outputs, then 22 black outputs, etc. In this case, the number of samples of each of the pattern outputs will be inversely proportional to the velocity of the strip 34 and the airbag 24 deployment velocity.

Figure 5:
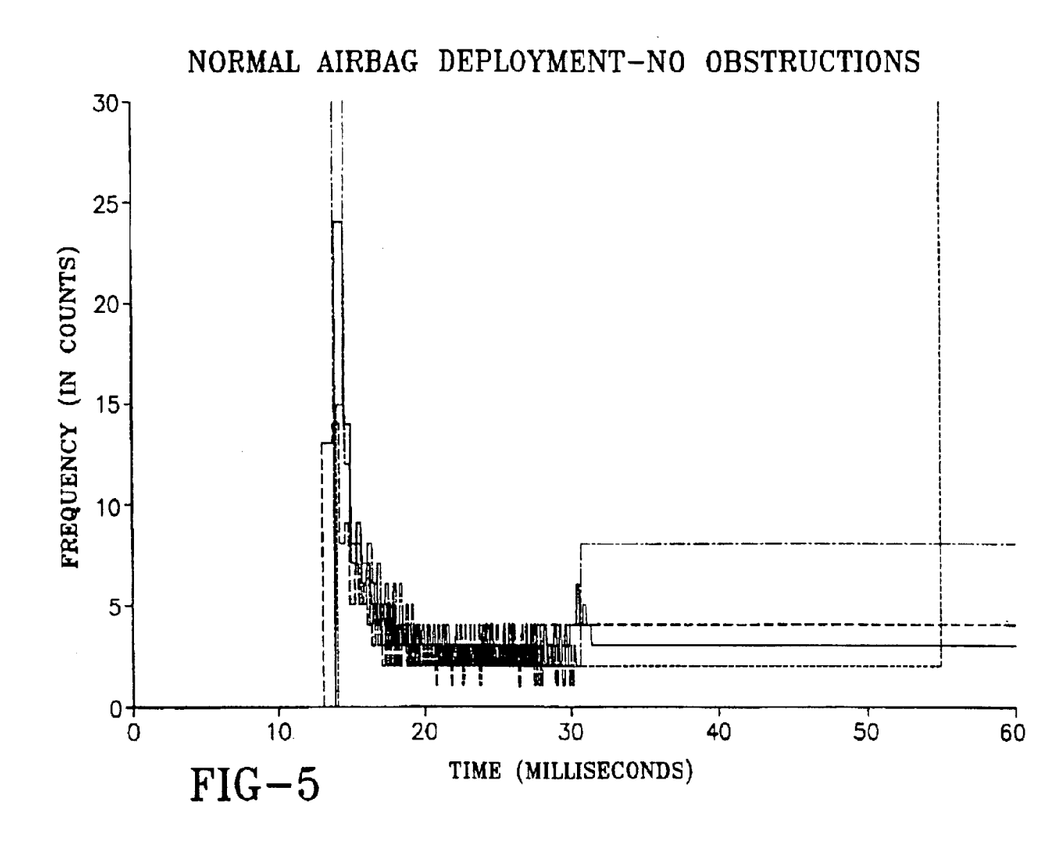
FIG. 5 is a graph of the number of samplings in each of the pattern outputs during a normal deployment with no obstructions.

The simulation from FIG. 2 (no obstruction) is shown graphically in this manner in FIG. 5. The number of samples taken in each of the pattern outputs (e.g. black and white) is graphed over time. As can be seen, the number decreases over time after the initial firing of the airbag 24, indicating an airbag 24 that is accelerating.

Figure 6:
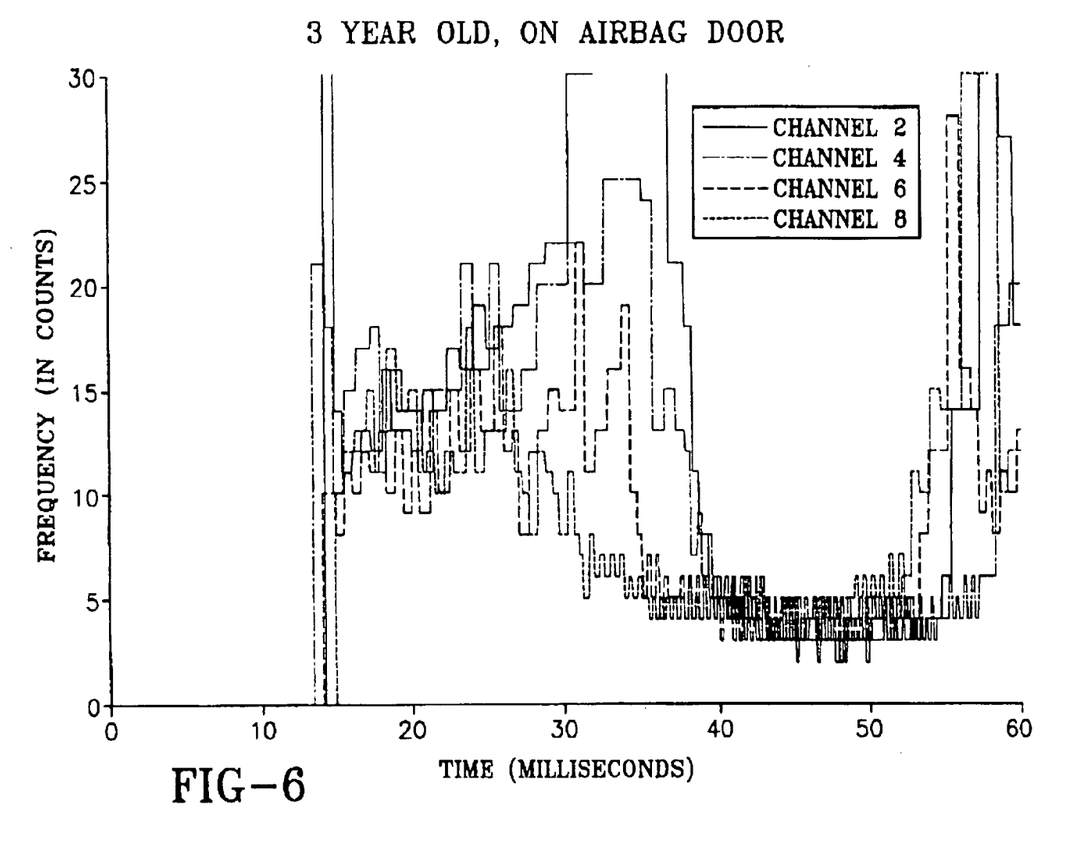
FIG. 6 is a graph of the number of samplings in each of the pattern outputs during a simulated deployment with a 3-year-old on the airbag door.

The simulation from FIG. 3 (3-year-old occupant on door) is shown in this manner in FIG. 6. As can be seen, the number of samplings, (shown as Channels 2, 4, 6 and 8) in each pattern output does not decrease as low as in FIG. 5, indicating that the airbag has not accelerated as much as in FIG. 5 because an occupant has been impacted.

Figure 7:
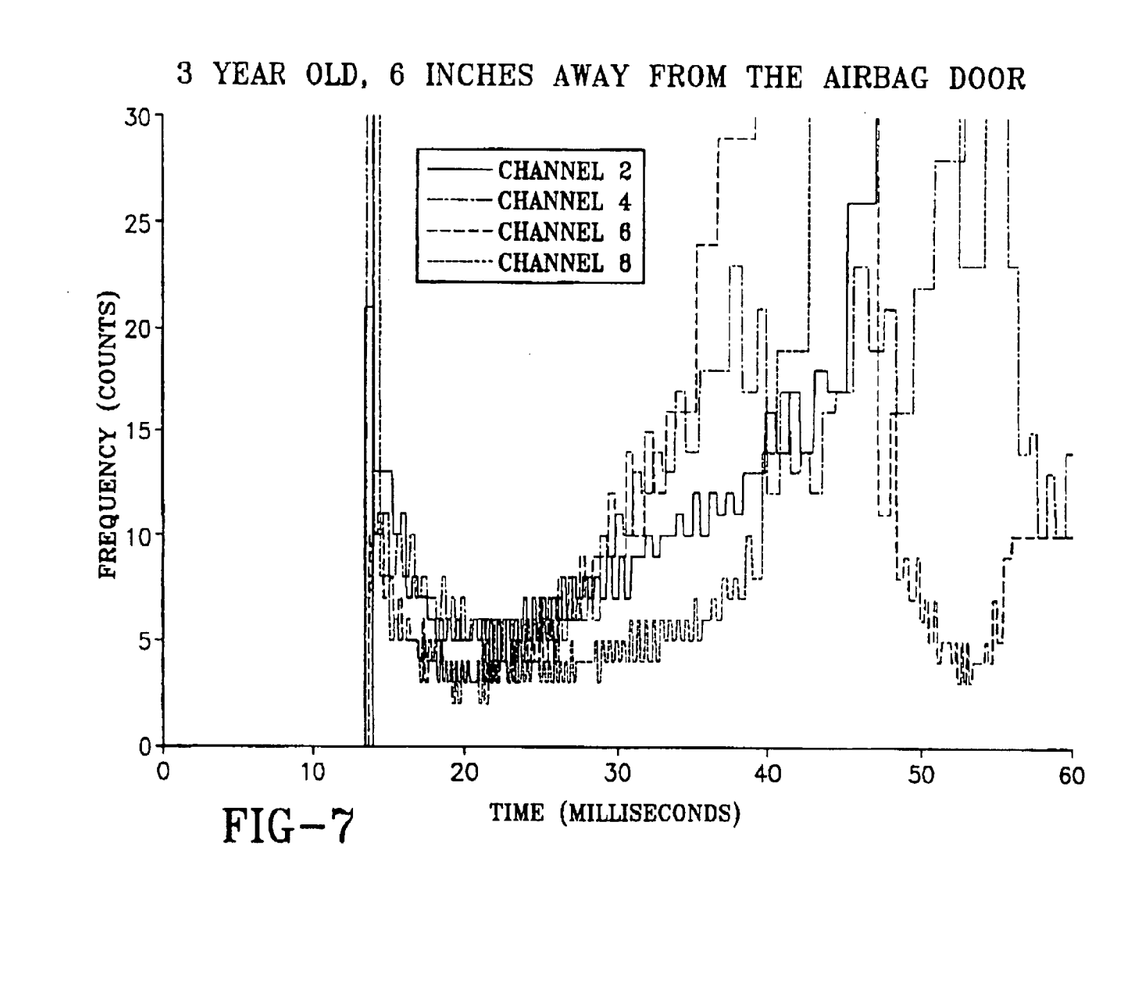
FIG. 7 is a graph of the number of samplings in each of the pattern outputs during a simulated deployment with a 3-year-old six inches from the airbag door.

The simulation from FIG. 4 (3-year-old occupant six inches from door) is shown in this manner in FIG. 7. As can be seen, the number of samplings drops initially, as the airbag 24 initially accelerates, but then rises again as the airbag 24 slows as it impacts the occupant.

Figure 8:
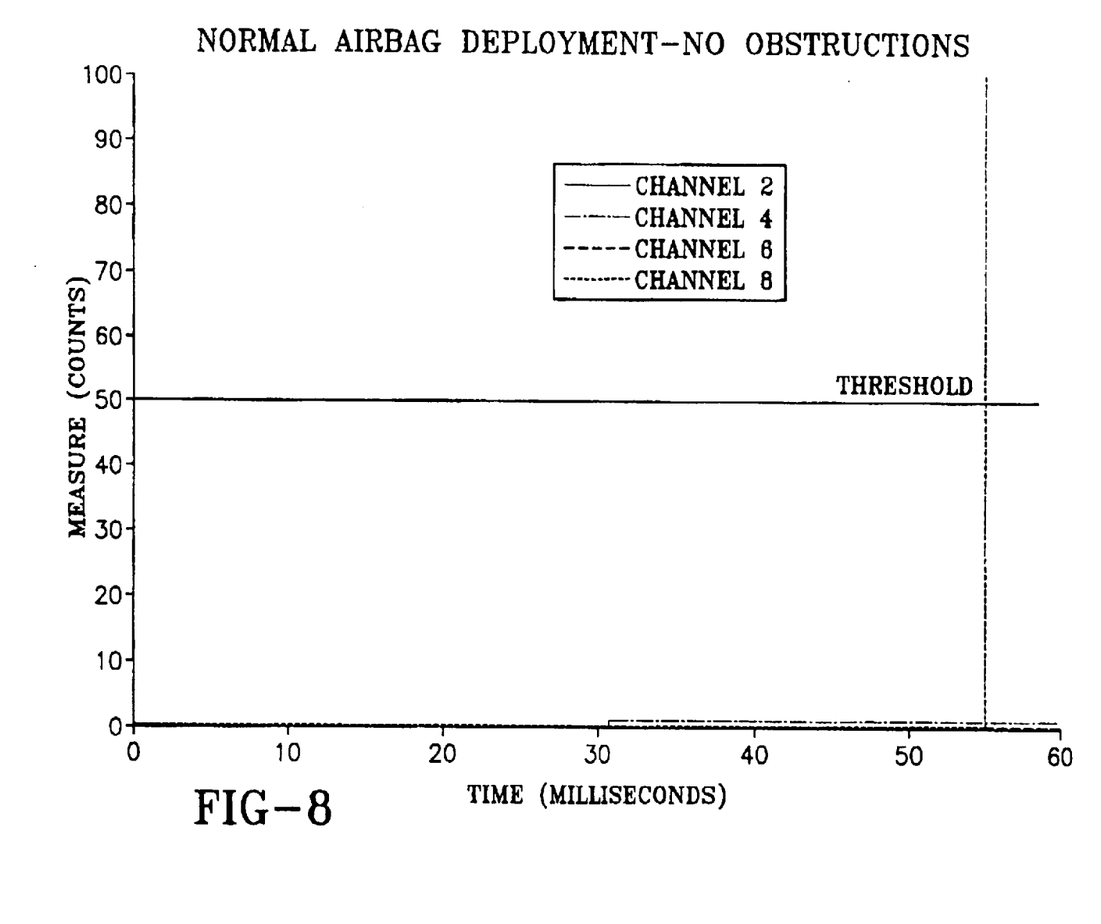
FIG. 8 is a graph of the sum of the number of samplings with a forgetting factor during a normal deployment with no obstructions.
Figure 9:
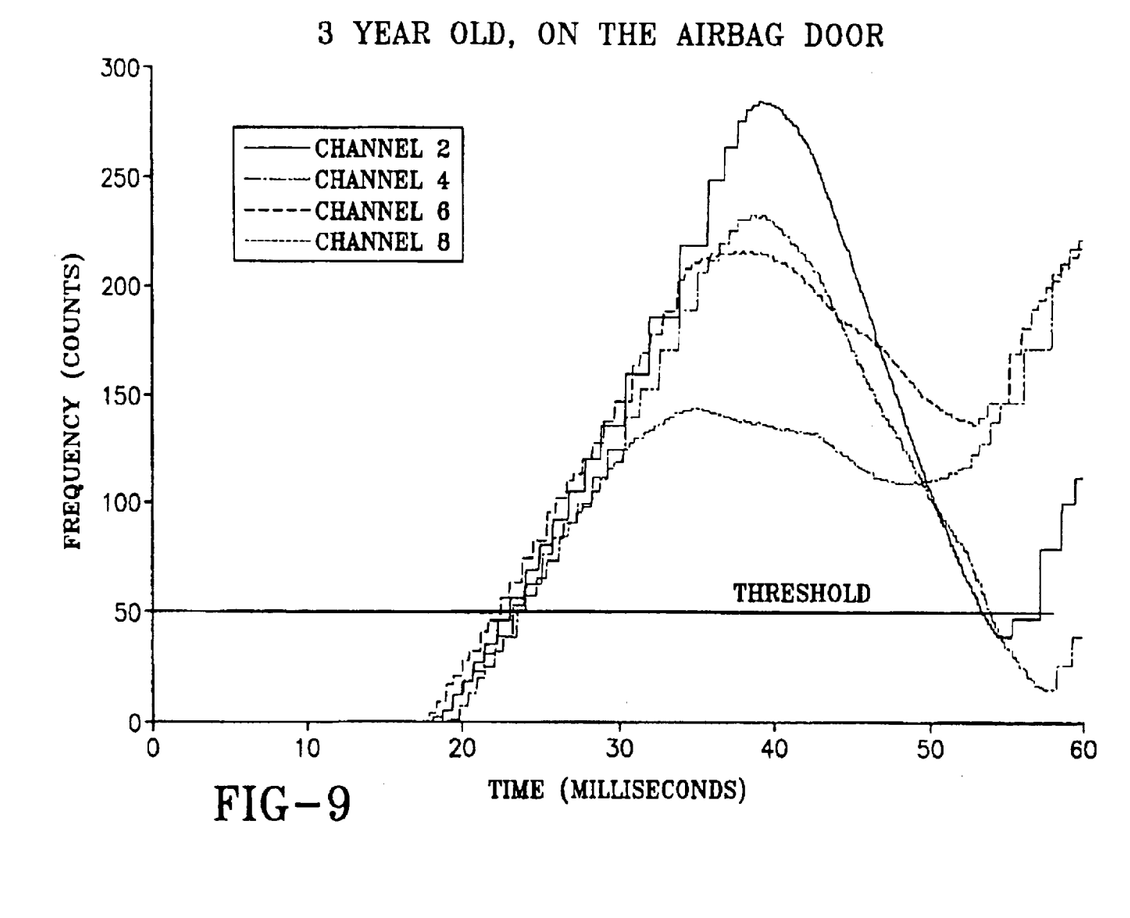
FIG. 9 is a graph of the sum of the number of samplings with a forgetting factor during a simulated deployment with a 3-year-old on the airbag door.
Figure 10:
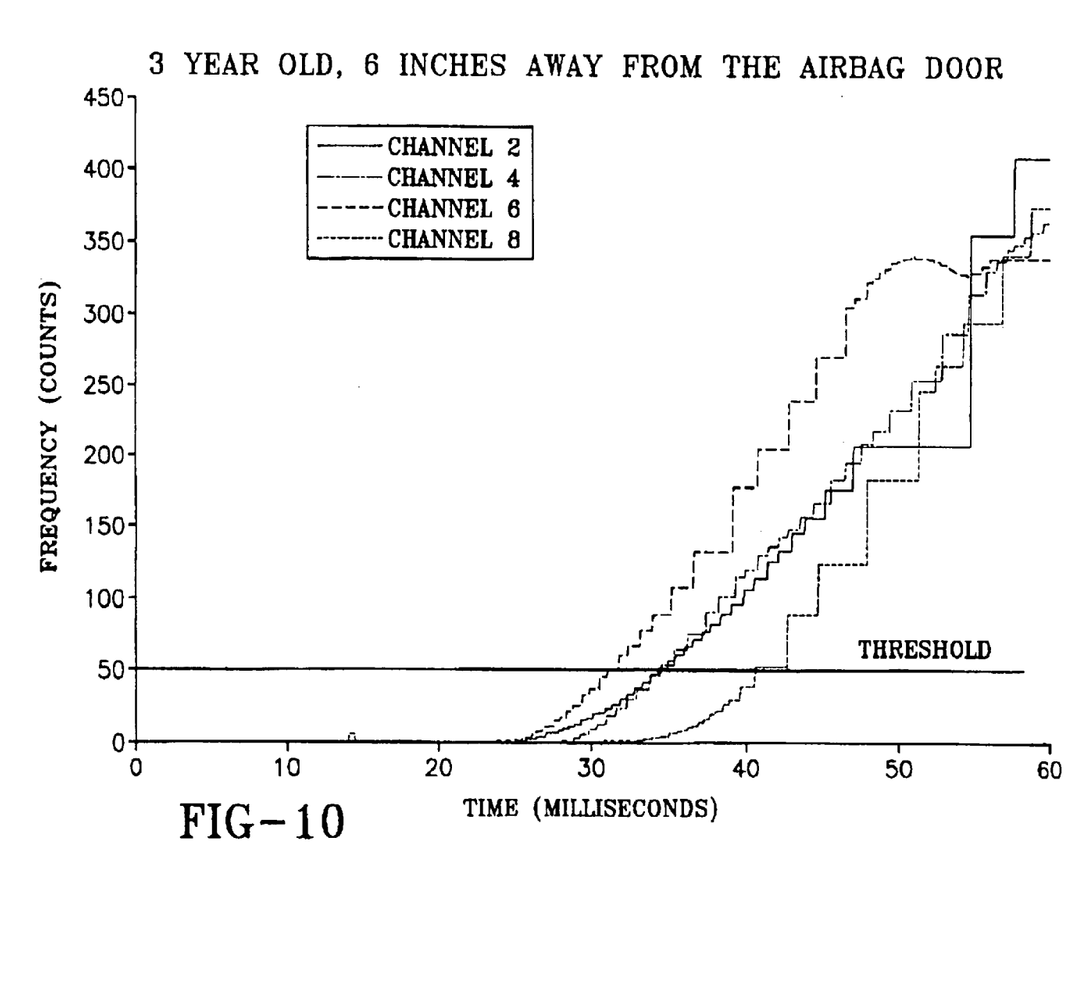
FIG. 10 is a graph of the sum of the number of samplings with a forgetting factor during a simulated deployment with a 3-year-old six inches from the airbag door.

FIGS. 8–10 are graphs representing another technique for analyzing this data. In FIGS. 8–10, a "forgetting factor" is subtracted from each of the samplings, (shown as Channels 2, 4, 6 and 8), from each pattern output, and this result (clipped to be not less than zero) is accumulated in a sum. The forgetting factor is preferably a function of time. In particular, the forgetting factor should approximate, or be slightly larger than, the expected counts to be expected at the various points in time from a normal activation with no obstruction. Therefore, for example, activation with no obstruction would result in a graph maintained at approximately zero over time, as shown in FIG. 8, well under the threshold.

In FIG. 9, because the higher number of samples per pattern output is higher than the expected values and higher than the forgetting factors, the controller 30 begins to accumulate counts and relatively quickly exceeds the threshold. When the threshold is exceeded, the controller 30 determines that the airbag 24 has impacted an occupant and activates the vent 27. Similarly, in FIG. 10, the accumulated counts exceed the threshold, indicating contact with an occupant six inches away from the airbag door.

In accordance with the provisions of the patent statutes and jurisprudence, exemplary configurations described above are considered to represent a preferred embodiment of the invention. However, it should be noted that the invention could be practiced otherwise than as specifically illustrated and described without departing from its spirit or scope.

What is claimed is:

1. A vehicle airbag system comprising:
    an airbag;
    an airbag inflator for selectively inflating the airbag;
    at least one strip connected to the airbag;
    at least one sensor generating an output based upon deployment of the at least one strip, the sensor sensing a velocity of the strip; and a controller determining whether the airbag has contacted a vehicle occupant based upon a frequency of the output from the at least one sensor, the at least one strip including a pattern that generates the frequency in the output of the sensor that varies based upon the velocity of the strip, and the controller causes the airbag inflator to reduce inflation of the airbag based upon a determination that the airbag has contacted the vehicle occupant as indicated by a decrease in velocity of deployment of the airbag, the controller applying a frequency domain transform to the output from the sensor and the controller analyzing the frequency domain-transform to determine whether the airbag has contacted the vehicle occupant.

2. The system of claim 1 wherein the controller applies a Walsh transform to the output from the sensor.

3. A method for activating an airbag including the steps of:
  a. initiating inflation of an airbag;
  b. generating a sensor output having a frequency proportional to the speed of travel of the airbag;
  c. analyzing the frequency of the sensor output, the analysis including applying a frequency domain transform to the frequency;
  d. analyzing the frequency domain transform to determine whether the airbag has contacted a vehicle occupant; and
  e. ceasing or continuing inflation of the airbag based upon the determination in step d.

4. The method of claim 3 further including the step of ceasing inflation of the airbag based upon a determination that the airbag has contacted an out-of-position vehicle occupant.

5. The method of claim 4 further including the step of venting an airbag inflator in order to perform the step of ceasing inflation.

6. The method of claim 3 wherein the frequency domain transform is a Walsh transform.

7. A method for activating an airbag including the steps of:
  a. initiating inflation of an airbag;
  b. generating a sensor output having a frequency proportional to the speed of travel of the airbag;
  c. analyzing the frequency of the sensor output by applying a frequency domain transform to the frequency; and
  d. determining whether the airbag has contacted an occupant based upon the analysis including the frequency domain transform in step c.

8. The method of claim 7 further including the step of ceasing inflation of the airbag based upon a determination that the airbag has contacted an out-of-position vehicle occupant.

9. The method of claim 8 further including the step of venting an airbag inflator in order to perform the step of ceasing inflation.

10. The method of claim 9 wherein the frequency domain transform is a Walsh transform.

* * * * *